(12) United States Patent
Ferlitsch

(10) Patent No.: US 7,411,692 B2
(45) Date of Patent: Aug. 12, 2008

(54) METHOD AND APPARATUS FOR BUILDING A COMPOSITE PRINT JOB

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 924 days.

(21) Appl. No.: 10/723,467

(22) Filed: Nov. 26, 2003

(65) Prior Publication Data
US 2005/0111024 A1 May 26, 2005

(51) Int. Cl.
*G06F 15/00* (2006.01)
*G06F 15/16* (2006.01)

(52) U.S. Cl. ..................... 358/1.15; 709/203
(58) Field of Classification Search ....... 358/1.15–1.18, 358/1.13, 403, 521, 462; 709/203, 220, 229–230; 707/1, 10, 104.1; 715/274, 255; 399/87, 399/382
See application file for complete search history.

(56) References Cited

U.S. PATENT DOCUMENTS

| | | | |
|---|---|---|---|
| 5,579,087 A | 11/1996 | Salgado | |
| 5,600,762 A | 2/1997 | Salgado et al. | |
| 6,151,131 A | 11/2000 | Pepin et al. | |
| 6,173,295 B1 | 1/2001 | Goertz et al. | |
| 2002/0018235 A1 | 2/2002 | Ryan et al. | |
| 2002/0051241 A1 | 5/2002 | Ogino | |
| 2002/0089689 A1 | 7/2002 | Ferlitsch et al. | |
| 2002/0097424 A1 | 7/2002 | Ferlitsch | |
| 2003/0007179 A1 | 1/2003 | Ferlitsch | |
| 2003/0123084 A1* | 7/2003 | Brossman et al. | 358/1.15 |
| 2003/0184799 A1 | 10/2003 | Ferlitsch | |

* cited by examiner

Primary Examiner—Saeid Ebrahimi Dehkordy
(74) Attorney, Agent, or Firm—Madson & Austin

(57) ABSTRACT

The invention is directed to a method and apparatus for building a composite print job. According to a method, at least first and second files are received in respective printer independent file formats. The first and second files are printed to a logical printing device in a printer dependent file format appropriate for a physical printing device. The first and second files are thereafter combined as a composite print job, to prepare the first and second files for printing to the physical printing device.

9 Claims, 5 Drawing Sheets

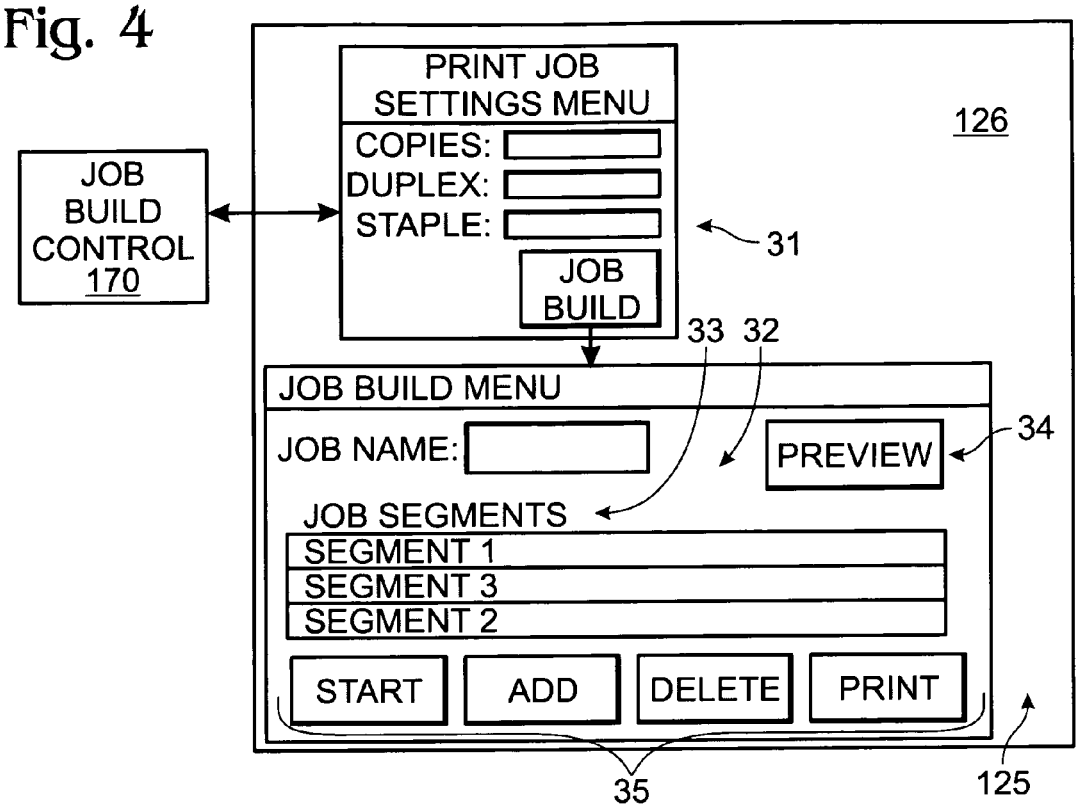
Fig. 4
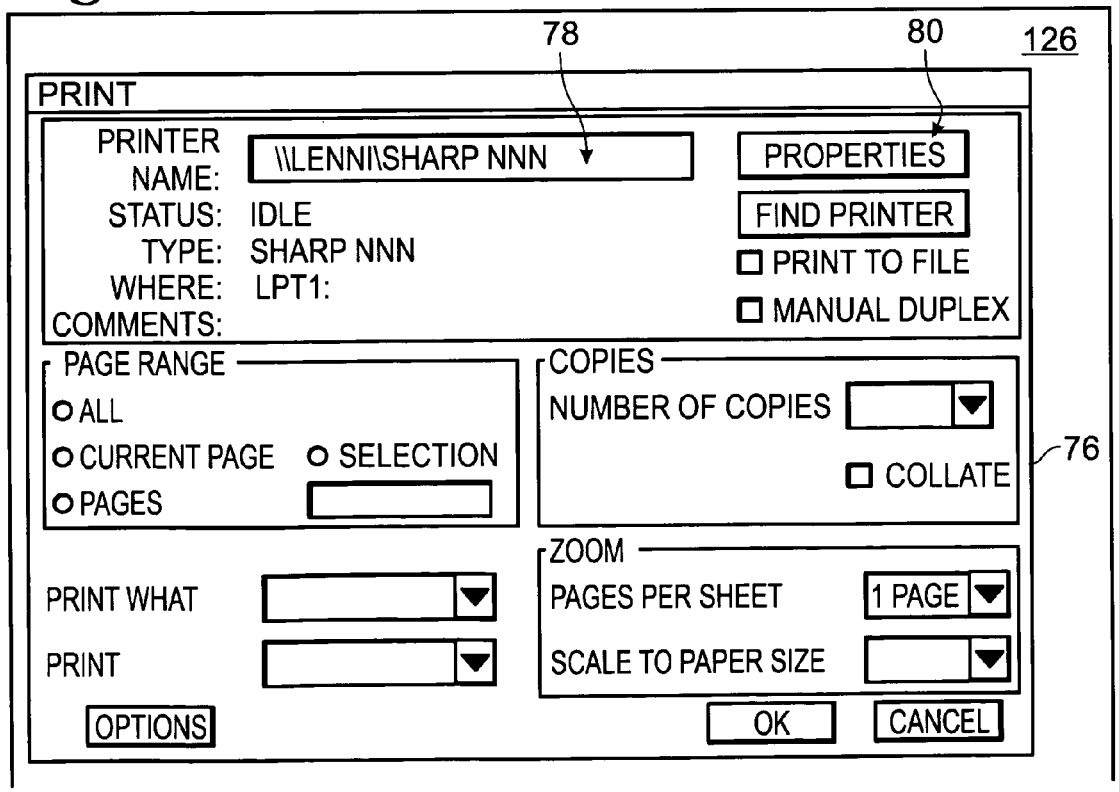
Fig. 5 *(PRIOR ART)*

METHOD AND APPARATUS FOR BUILDING A COMPOSITE PRINT JOB

FIELD OF THE INVENTION

The invention relates to a method and apparatus for building a composite print job.

BACKGROUND

It is often desired to combine files for printing, i.e., to create a composite print job. For example, a user may wish to combine two documents into a single composite document. In this example, a composite print job may comprise multiple copies of the composite document. Further, a composite print job may include stapling one or more of the composite documents together.

For some purposes, a composite print job can be created using a sequence of ordinary print commands provided by the typical software application. For instance, a user may make multiple copies of a composite document, which is to be created from two documents, by issuing a print command for the first document and then another print command for the second document. This group of two print commands causes the printing of one copy of the composite document, and multiple groups of two print commands causes the printing of multiple copies of the composite document. If the user desires, for example, 10 copies of the composite document, the user needs to issue 10 groups of print commands. However, the repetition involved is inefficient and tiresome. The user could issue one print command that provides for printing 10 copies of the first document, and then another print command that provides for 10 copies of the second document. While this would reduce the number of print commands required, it would require manual assembly of the 10 composite document copies. As before, the manual assembly of composite documents is inefficient and tiresome. Moreover, other purposes cannot be accomplished using the print commands ordinarily provided in application software. For example, application software ordinarily does not provide the capability to staple three separate documents together.

Software has been provided to solve these problems. Specifically, this software is adapted to create a composite print job from documents or other separate files that are available electronically. A particularly efficient example of such software is manufactured and marketed by Sharp Laboratories of America, Inc., under the trademark SHARPDESK®. This software may be thought of as providing two modules which will be referred to as a document identification module and a document combining module. The document identification module permits the user to enter the various documents or files into a designated memory (a "repository"). The document combining module is then invoked by the user to read the documents from the repository and print the documents according to user instructions. The user instructions are input via a user interface that presents an array of choices. The user interface includes a means for selecting or otherwise identifying the printer to be used.

The documents are created by one or more applications, e.g., a word processing, spreadsheet, browser, database, drawing, scanning, graphic image processing, or other program running on the underlying operating system of a computer. The documents are created, stored, and manipulated by the application in an application specific document format.

In the printing process, the application converts the document into the particular printer independent file format ("PIFF") it supports in cooperation with the operating system. Typically, the operating system is a Microsoft Windows® operating system. In a Windows environment, when a user instructs an application to print a document, the application creates a device context, draws objects to the device context, and then calls a graphics device interface ("GDI"). The GDI converts the GDI data to device dependent interface (DDI) data which is passed to a document combining device driver. In this example, the document combining device driver then converts the DDI data into the particular printer independent file format ("PIFF") that is supported by the document combining module, such as Microsoft Windows® EMF (enhanced metafile), TIFF (Tagged Image File Format) version 6.0, or Adobe PDF (portable document format). It is in this way that the application converts the document into the particular printer independent file format ("PIFF") that it supports, such as EMF, TIFF, or PDF.

The SHARPDESK document identification module receives the documents in the PIFF and stores the documents in the same PIFF format in the repository. The user identifies the documents to be included in the composite print job by providing a "print file" command for each document.

After all of the documents have been identified, the document combining module manipulates the documents according to user instructions in the PIFF. Thereafter, the document combining module calls a printer driver that is specific to the printer selected by the user for printing the composite job. The printer driver converts the documents into a printer dependent file format ("PDFF") required by the printer.

The inventor has recognized that it would be desirable to improve the print quality of composite print jobs. The prior art software for creating a composite print job manipulates data in a PIFF rather than a PDFF because neither the document identification module nor the document combining module "knows" the format required by the printer—only the printer driver has this information. However, this results in a lack of capability to optimize the print job. Particularly, the prior art software must employ one of two strategies. In one strategy, the software assumes an "ideal" printer. However, if the printer to which the print job is actually sent is not an "ideal" printer, some print features or capabilities may be lost in the process of printing. In the alternative strategy, the software assumes a "worst-case" printer in an attempt to avoid this problem.

However, if the printer is better than worst case, use of some desirable features or capabilities may be avoided unnecessarily.

Accordingly, there is a need for a method and apparatus for building a composite print job that solves the aforementioned problems and meets the aforementioned needs.

SUMMARY OF THE INVENTION

A method for building a composite print job according to the present invention comprises receiving at least a first and second file in respective printer independent file formats. The first and second files are printed to a logical printing device in a printer dependent file format appropriate for a physical printing device. The first and second files are combined as a composite print job, to prepare the first and second files for printing to the physical printing device.

An apparatus for building a composite print job according to the present invention is provided for printing to a physical printing device defined by one or more attributes. The composite print job includes at least a first file and a second file, the first and second files being in respective printer independent file formats. The apparatus comprises a logical printing device defined by the one or more attributes, a user interface and a combining module. The user interface is adapted, in response to one or more file commands from a user, for printing the first and second files to the logical printing device in a printer dependent file format adapted to the one or more attributes. The combining module is adapted for combining the first and second files as a composite print job, and to prepare the first and second files for printing to the physical printing device.

The foregoing and other objectives, features, and advantages of the invention will be more readily understood upon consideration of the following detailed description of the invention, taken in conjunction with the accompanying drawings.

DESCRIPTION OF THE DRAWINGS

FIG. 4 is a diagram of a job build control module and one preferred embodiment of a user interface according to the invention.

FIG. 5 is a diagram of a known print dialog box.

DETAILED DESCRIPTION

In a preferred embodiment, the invention is directed to a method and apparatus for building a composite print job for printing to a printer.

A print job generally defines content and instructions for rendering the content on a printing device. (The terms "printer" and "physical printer" will be used herein to refer to any type of printing device, whose output may be hardcopy, such as that created by a laser printer, or softcopy, such as that created by a facsimile device.) A print job produces a body of such content that the user wishes to print as a whole document. The term "document" as used herein may include any combination of text, images, or other data that can be printed. A composite print job comprises a plurality of files, referred to herein as "segments" to indicate that they are components of the composite print job. A composite print job employs a single set of instructions for rendering all of the content. It will be appreciated that a composite print job is distinguishable from a compound print job. A compound print job schedules and prints multiple documents as a group, but does not otherwise provide for treating the documents as a group. In a compound print job, a separate set of instructions for rendering the content is provided for each document. By contrast, a composite print job provides for group-wide or job-wide treatment of multiple documents, such as specifying the number of copies of the group of documents, stapling the group of documents together, and printing the documents of the group in duplex form, such that no blank pages are produced even for documents having an odd number of pages.

Figure 1:
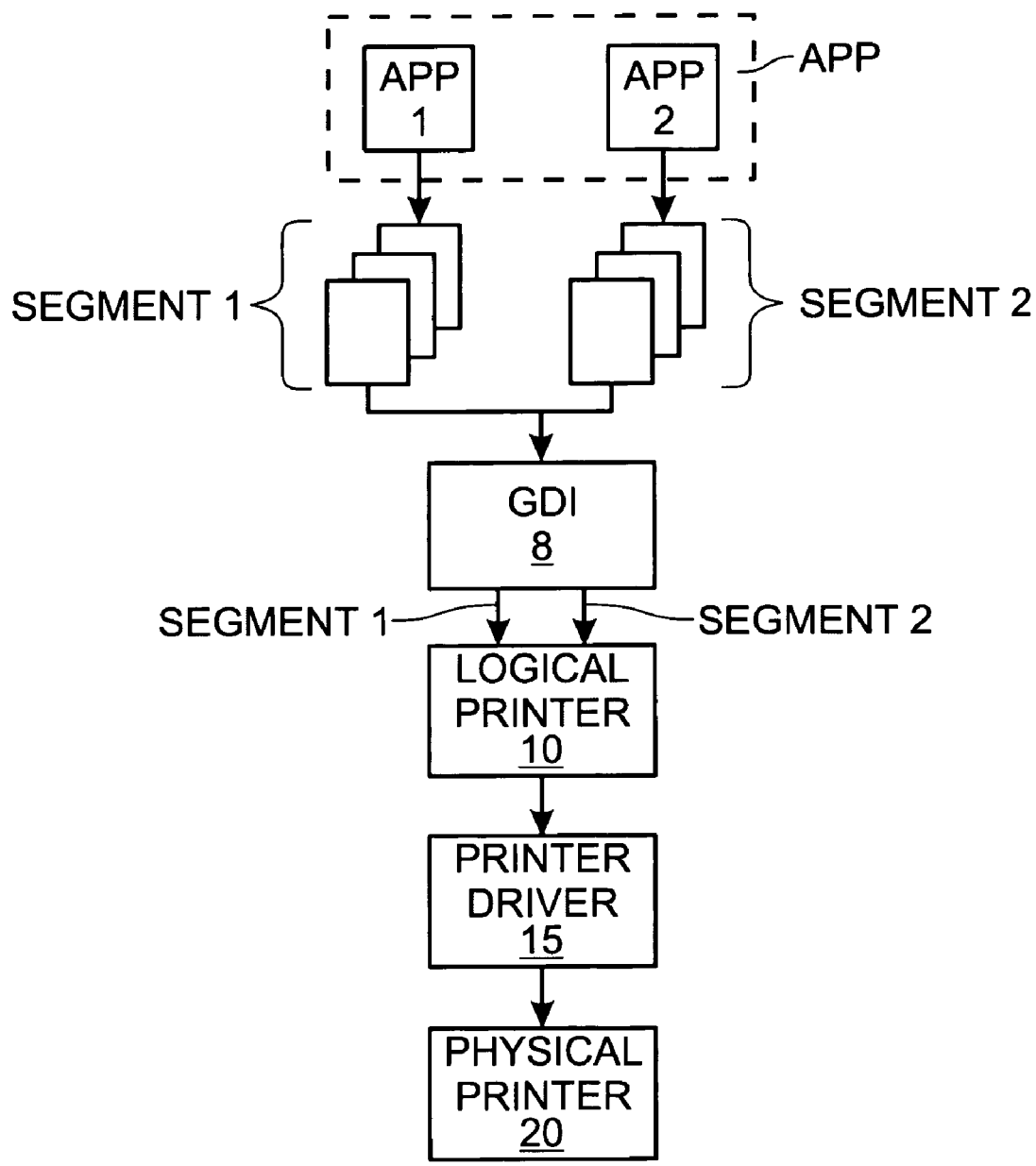
FIG. 1 is a schematic diagram of a method and apparatus for building a composite print job that includes a logical printer, a printer driver, and a physical printer.

Referring to FIG. 1, a method and apparatus for building a composite print job is shown. Segments are provided by one or more application programs. For example, the segment #1 may be provided by the application program APP 1 and the segment #2 may be provided by the application program APP 2, or the segments #1 and #2 may be provided by the same application program indicated in the figure as "APP." The segments either reside in or are accessible by a user's computer, and have associated filenames which provide a means for identifying the segments. The segments that are printable to a printer may include any combination of text, vector (i.e., line art) and image data or, more generally, data from which printable text, line art or images may be derived. The print data of which the segments are composed is provided by the application program in a native format, which is a PIFF. When an application receives a print instruction from a user, the application interfaces with a device interface 8, such as a GDI, which converts the segment from an application specific document format to a PIFF, such as EMF, TIFF, or PDF, which is then converted by the printer driver to a printer dependent file format (PDFF).

A logical printer 10 receives the print data from the device interface 8 and is adapted to provide for (a) ordering of the segments, and (b) establishing job-wide settings for the composite print job. In the prior art, these functions have been performed while the print data is formatted in a PIFF. To print to a particular physical printer 20, the logical printer 10 invokes an appropriate printer driver 15, which converts the composite print job into the PDFF required by the physical printer 20.

Figure 2:
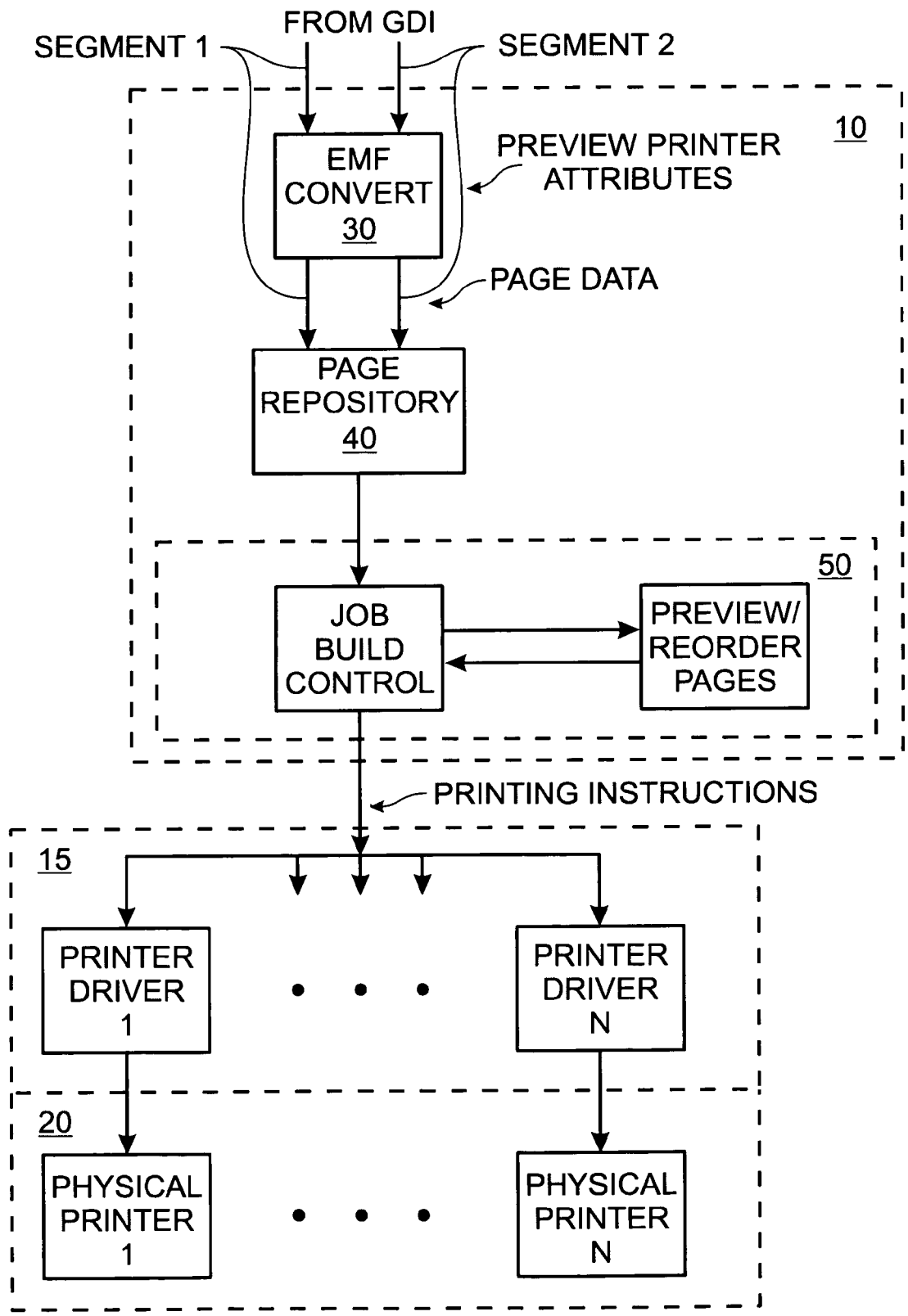
FIG. 2 is a schematic diagram of a known logical printer, a printer driver, and a physical printer.

Turning to FIG. 2, a known logical printer 10, a printer driver 15, and a physical printer 20 are shown. The prior art logical printer 10 includes a data converter 30 for converting the native print data into EMF data. The converter 30 also provides pseudo attributes for a generic, pseudo printer so that the EMF data is formatted into pages for subsequent manipulation as page data. The page data is temporarily stored in a page memory or repository 40 and is provided to a job build module 50, which provides the composite job functionality mentioned above. The job build module 50 provides for merging the pages as instructed by the user and applying job-wide formatting instructions. The module 50 further provides a user with a preview of the print job and the opportunity to reorder the pages before sending the page data as printing instructions to the printer driver 15 and the physical printer 20.

The printer driver 15 represents one or more printer drivers, and the printer 20 represents one or more physical printers. The job build module 50 permits the user to select one of the printers and address the printing instructions to the selected printer. However, it will be appreciated that with respect to the prior art logical printer 10, the printing instructions have not been optimized for the printer that is ultimately selected.

Figure 3:
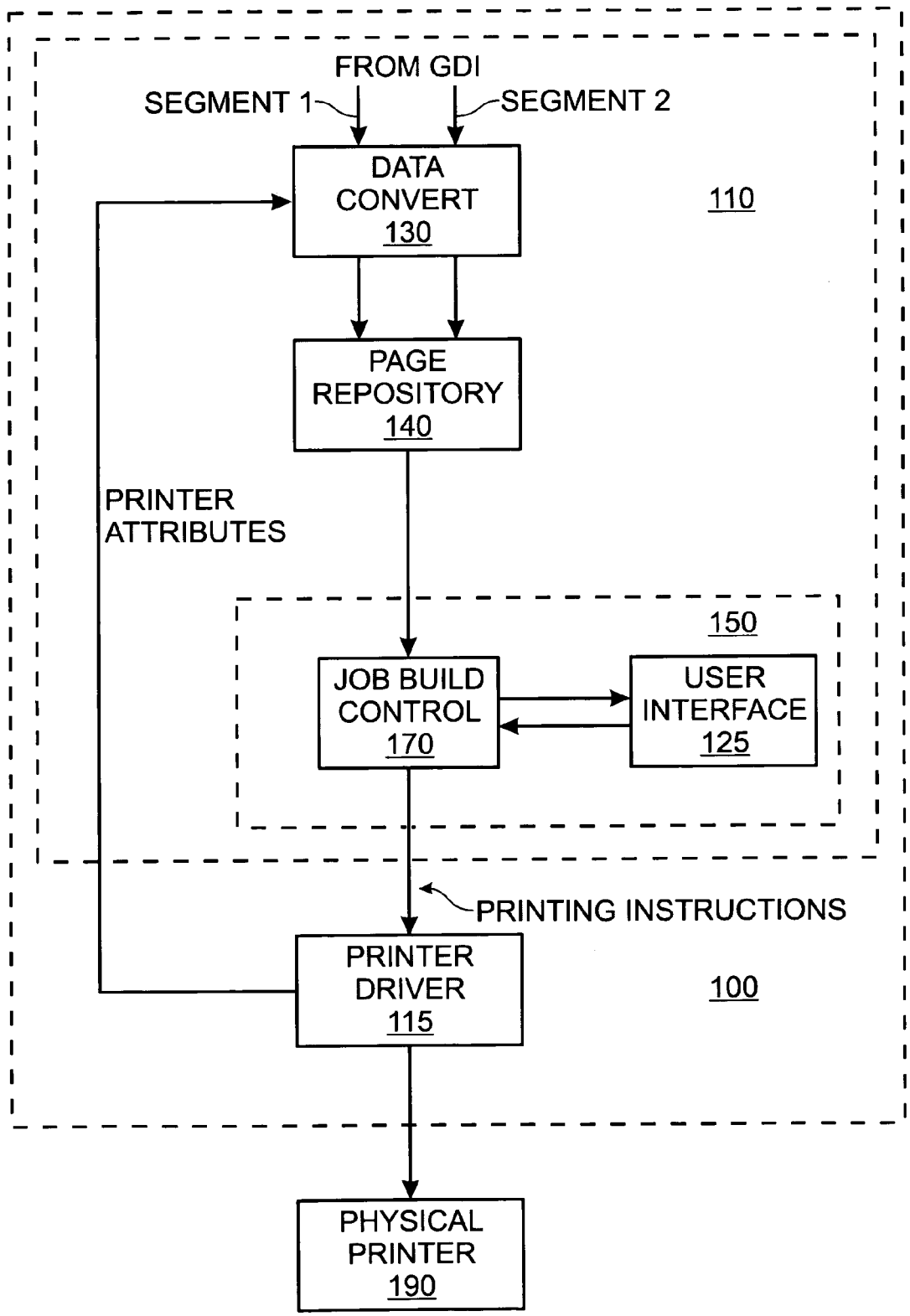
FIG. 3 is a schematic diagram of a logical printer, a printer driver, and a physical printer according to the invention.

Turning to FIG. 3, an apparatus 100 for building a composite print job according to the invention and a physical printer 190 are shown. The apparatus 100 includes a logical printer 110 corresponding to the logical printer 10 of FIG. 1. It is an outstanding feature of the invention that the logical printer 110 includes a data converter 130 which converts the print data from its native format to a PDFF adapted to the specific printer which the user seeks to use. In the embodiment shown in FIG. 3, this is accomplished by providing a single physical printer 190, and programming the data converter 130 with the attributes of the physical printer 190. Hence, the data converter 130 may format the segments according to the formatting capabilities and features of a particular physical printer, to optimize the job for that printer. A printer driver 115 for the physical printer 20 is incorporated into the composite print job building apparatus 100, so that the entire apparatus 100 may be thought of as a printer driver having enhanced job capabilities. The job build module 150 includes a job build control module 170 and a user interface

125. User instructions are provided to the job build control module 170 via the user interface 125.

FIG. 4 shows an example of one preferred embodiment of the user interface 125 as it would be viewed by a user on a display 126. The user interface 125 provides the user options for building the composite print job. As will be appreciated by one skilled in the art, when a user instructs an application to print a document, the application makes a call to the operating system, and the operating system responds by displaying a print dialog box 76, such as the one shown in FIG. 5. The user selects a printer, page range, number of copies, and other print options in the print dialog box 76, and then clicks "OK" to print the document. The user interface 125 is preferably adapted for use with the print dialog box 76 provided by the operating system.

In operation, the user preferably adds a segment to a print job by instructing the application which created the segment to print it. The print instruction will cause the operating system to display the print dialog box 76. Instead of selecting an object linked to a physical printer in the printer name box 78, the user selects an object which represents the composite print job building apparatus 100. When the user clicks "OK" to print, the segment does not print; rather, the segment is added to the page repository 140. This process is repeated for each segment the user desires to add to the composite print job.

From the print dialog box 76, the user may select composite print job building apparatus 100 as the selected printer, and by making another selection, e.g., by clicking on the "properties" button 80, a "job-wide settings" menu 31 is displayed. Preferably, the user performs the steps required to display the job-wide settings menu 31 after all desired segments have been added to the composite print job, however, it is possible to display the menu 31 at any time. The job-wide settings selectable from the menu 31 include selecting the number of copies of the job. In addition, the user may also specify whether or not to perform duplex printing, or to staple the job. Other job-wide features may be provided as desired.

It may be noted that, without the composite print job building apparatus 100, printing M copies of N segments would require the user to provide M×N print commands. By contrast, the user of the composite print job building apparatus 100 need only perform N+1 operations, i.e., N operations for identifying the N segments and one operation for selecting M as the number of copies of the composite job. In general, for functions that treat the segments as groups, the job-wide settings of the present invention provide outstanding advantages.

From the job-wide settings menu 31, the user may click a "Job Build" button which causes a segment specification menu 32 to be displayed. The segment specification menu 32 provides a means for the user to specify the order of printing the segments in the composite job, as well as the page order within the segments. The segments are combined by ordering the segments, or pages within the segments, with respect to one another. For example, a user may have three segments that the user wishes to combine: Segment #1, Segment #2, and Segment #3. Segment #1 may be a two page document; Segment #2 may be an image; Segment #3 may be a one page document. The user may wish to print the segments in the following order: Segment #1, Segment #3, Segment #2. If Segment #1 is the first segment of the requested print job, the job build control module 170 enters the filename of the segment, or some other name for the segment if that is desired, into a "Job Segments" list 33. Subsequently selected segments will be entered in order on the list. Alternatively, the user can enter filenames directly into the "Job Segments" list, where the apparatus 100 may be adapted to open the segments using an appropriate application.

An indication can be given to the job build control module 170 that the user desires to reorder the list, and how to reorder the list, by any known means, such as by clicking and dragging the filenames (or alternative names) to other locations on the list. For this purpose, the list can be scrolled up or down to provide room for moving segments with respect to one another on the list, where only the order is important.

The composite print job building apparatus 100 further preferably provides for reordering pages such that, for example, page 2 of Segment #1 can be made to follow page 3 of Segment #2. This functionality is provided by a "Preview" function, which may be invoked, for example, by clicking the preview button 34. The preview function provides a thumbnail of each page of the entire print job so that individual pages can be clicked and dragged into a different order where desired. The preview function also provides a capability to test the job for print quality, job completeness, or page/document formatting before actually committing the job to paper. The "Preview" function may also be used to reorder segments.

Other combinations of the segments may be provided in addition to merely reordering the segments, or ordering pages within the segments, and other manipulations of the segments may be provided in addition to merely combining the segments, without departing from the principles of the invention. For example, an image may be combined with text by placing the image on a particular page of a segment, or at a particular place within a particular page of the segment, and segments may be manipulated by reformatting the segments, e.g., to a common font size or to common margins.

The user interface 125 further provides a control menu 35 for entering control commands. "Start" may be used to indicate that a segment is the first segment of the job. Alternatively, the apparatus 100 may assume that the first segment on the list begins the job. "Add" may be used to indicate that a segment is to be added to the job. Alternatively, the apparatus 100 may assume that any segments added to the list should be added to the job. "Delete" may used to indicate that an indicated segment (e.g., highlighted segment) should be deleted from the job.

Finally, "Print" is used to print the job. A print command is generated by the user interface 125 for instructing the associated application to print. The apparatus 100 provides a print queue for queuing the segments. For each segment, the associated application communicates with the apparatus 100 as though the device apparatus 100 is a physical printing device. As for a physical printing device, the apparatus 100 provides to the application a set of printer attributes defining the capabilities that the application should assume in formatting segments for printing.

Using the attributes that have either been programmed into or determined by the apparatus 100, the apparatus 100 emulates the selected printing device by providing the attributes to the requesting applications. The segments are formatted according to the printer dependent attributes using printer dependent segment formats for the segments.

Figure 6:
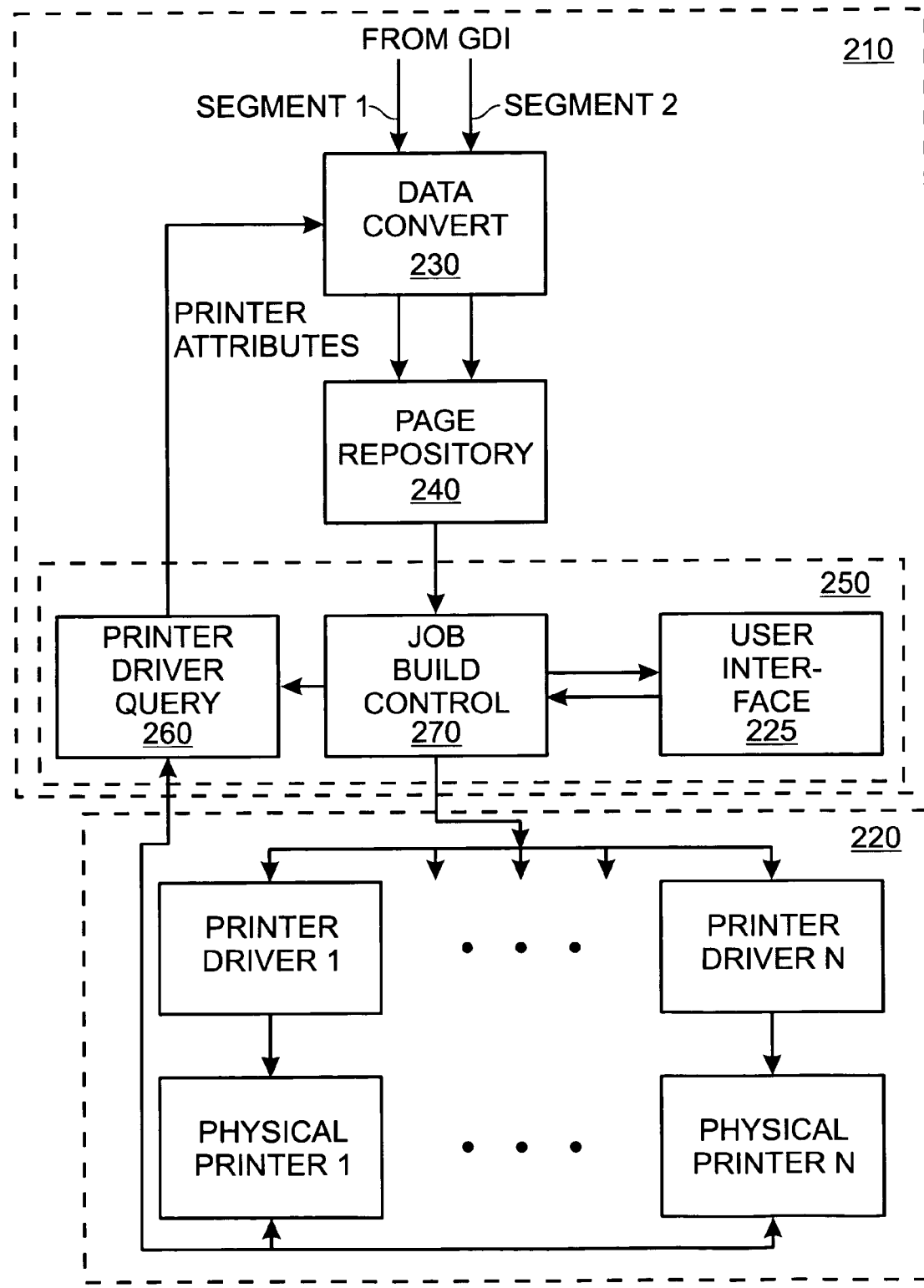
FIG. 6 is a schematic diagram of an alternative preferred embodiment of a method and apparatus for building a composite print job according to the invention.

FIG. 6 shows an alternative embodiment 210 of an apparatus for building a composite print job according to the present invention. The composite print job building apparatus 210 operates in conjunction with a logical printer network 220 that includes one or more logical printers and their associated printer drivers. A job build module 250 provides, in addition to the features described above for the job build module 150, the ability to select a particular one of the one or more printers for printing the composite print job. To provide this additional feature, the job build module 250 includes a printer driver query module 260 adapted to query the printer drivers for the physical printers to determine the printer attributes for the printers. A user interface 225 permits the user to select a desired printer, and the printer driver query module 260 is directed by a job build control module 270 to provide the attributes of the selected printer to the data converter 230, so that the data converter 230 may format the segments according to the formatting capabilities and features of the selected printer, to optimize the job for the selected printer. In essence, the printer driver query module 260 provides the functionality of a printer driver for the apparatus 210, so that the entire apparatus 210 may be thought of as a printer driver having enhanced job capabilities.

The composite print job building apparatus 100, 210 as described above are preferably implemented in software by a general purpose computer executing a program of instructions embodied in a machine readable medium, such as the computer's hard disc drive. However, the composite print job building apparatus 100, 210 may be equivalently implemented in firmware or in hardware, or in any combination of software, firmware, and hardware, as will be readily appreciated by persons of ordinary skill.

The preferred embodiments of the invention have been described with respect to Microsoft Windows® operating systems using terminology generally used when referring to a Microsoft Windows environment. The invention is not limited, however, to embodiments for use in a Microsoft Windows environment. It is contemplated that the principles of the invention may be employed in computer systems that use other operating systems, such as, for example, Unix or Linux. In this connection, it will be appreciated that the terms, processing elements or modules, and processing steps used herein to describe embodiments of the invention for use in Microsoft Windows environment relate to equivalent or substantially equivalent terms, processing elements or modules, and processing steps that are used with respect to other operating systems.

It is to be recognized that, while preferred methods and apparatus according to the present invention have been shown and described, other methods and apparatus incorporating one or more of the features described herein may be employed without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited-only by the claims which follow.

The invention claimed is:

1. A method for building a composite print job, comprising the steps of:
  providing a user interface adapted to building a composite print job, wherein the user interface obtains a combining order, and wherein the user interface provides control commands including a start command and an add command, wherein the start command indicates a first segment of the composite print job, and wherein the add command indicates a segment to be added to the composite print job;
  receiving first and second files in respective printer independent file formats;
  printing said first and second files to a logical printing device in a printer dependent file format appropriate for a physical printing device; and
  combining said first and second files as a composite print job, to prepare said first and second files for printing to said physical printing device, wherein said first and second files are combined in accordance with the combining order which specifies the order in which said first and second files are printed by said physical printing device.

2. The method of claim 1, wherein said logical printing device has the same attributes as said physical printing device.

3. The method of claim 2, further comprising printing said composite print job to said physical printing device.

4. The method of claim 1, further comprising printing said composite print job to said physical printing device.

5. An apparatus for building a composite print job for printing to a physical printing device defined by one or more attributes, the composite print job including at least a first file and a second file, said first and second files being in respective printer independent file formats, the composite print job building apparatus comprising:
  a logical printing device defined by said one or more attributes;
  a user interface adapted to building a composite print job, wherein the user interface obtains a combining order, and wherein the user interface provides control commands including a start command and an add command, wherein the start command indicates a first segment of the composite print job, and wherein the add command indicates a segment to be added to the composite print job, and wherein the user interface is further adapted to print, in response to one or more control commands from a user, said first and second files to said logical printing device in a printer dependent file format adapted to said one or more attributes; and
  a combining module for thereafter combining said first and second files as a composite print job, to prepare said first and second files for printing to said physical printing device, wherein said first and second files are combined in accordance with a combining order which specifies the order in which said first and second files are printed by said physical printing device.

6. A machine readable medium encoding a program of instructions adapted for execution by the machine, the program of instructions adapted to execute a method for building a composite print job, the method comprising the steps of:
  providing a user interface adapted to building a composite print job, wherein the user interface obtains a combining order, and wherein the user interface provides control commands including a start command and an add command, wherein the start command indicates a first segment of the composite print job, and wherein the add command indicates a segment to be added to the composite print job;
  receiving first and second files in respective printer independent file formats;
  printing said first and second files to a logical printing device in a printer dependent file format appropriate for a physical printing device; and combining said first and second files as a composite print job, to prepare said first and second files for printing to said physical printing device, wherein said first and second files are combined in accordance with the combining order which specifies the order in which said first and second files are printed by said physical printing device.

7. The medium of claim 6, wherein said logical printing device has the same attributes as said physical printing device.

8. The medium of claim 7, wherein the method further comprises printing said composite print job to said physical printing device.

9. The medium of claim 6, wherein the method further comprises printing said composite print job to said physical printing device.

* * * * *